United States Patent [19]
Singh et al.

[11] Patent Number: 5,983,224
[45] Date of Patent: Nov. 9, 1999

[54] METHOD AND APPARATUS FOR REDUCING THE COMPUTATIONAL REQUIREMENTS OF K-MEANS DATA CLUSTERING

[75] Inventors: Vineet Singh, San Jose, Calif.; Sanjay Ranka; Khaled Alsabti, both of Gainesville, Fla.

[73] Assignee: Hitachi America, Ltd., Tarrytown, N.Y.

[21] Appl. No.: 08/962,470

[22] Filed: Oct. 31, 1997

[51] Int. Cl.[6] .................................................. G06F 17/30
[52] U.S. Cl. .......................... 707/6; 707/3; 707/4; 707/5
[58] Field of Search .................................. 707/3, 4, 5, 6

[56] References Cited

U.S. PATENT DOCUMENTS

| | | | |
|---|---|---|---|
| 5,040,133 | 8/1991 | Feintuch et al. | 702/180 |
| 5,561,722 | 10/1996 | Watari et al. | 382/209 |
| 5,710,916 | 1/1998 | Barbara et al. | 707/9 |
| 5,742,811 | 4/1998 | Agrawal et al. | 707/6 |
| 5,799,301 | 8/1998 | Castelli et al. | 707/6 |
| 5,819,258 | 10/1998 | Vaithyanathan et al. | 707/2 |
| 5,819,266 | 10/1998 | Agrawal et al. | 707/6 |
| 5,832,182 | 11/1998 | Zhang et al. | 706/50 |
| 5,835,891 | 11/1998 | Stoneking | 702/117 |
| 5,848,404 | 12/1998 | Hafner et al. | 707/3 |
| 5,857,179 | 1/1999 | Vaithyanathan et al. | 707/2 |

OTHER PUBLICATIONS

Arya, et al. "Accounting for boundary effects in nearest neighbor searching", Discrete & Computational Geometry, vol. 16, No. 2, Abstract Only, Sep. 1996.

Nene, et al., "A simple algorithm for nearest neighbor search in high dimensions", IEEE Transactions on Pattern Analysis and Machine Intelligence, vol. 19, No. 9, Abstract Only, Sep. 1997.

*High Dimensional Similarity Joins* by Kyuseok Shim, R. Srikant and Rakesh Agrawal, IBM Almaden Research Center, p. 1–11, Apr. 1997.

*Fast Similarity Search in the Presence of Noise, Scaling and Translation in Time–Series Databases* by Rakesh Agrawal, King–Ip Lin, H. Sawhney and Kyuseok Shim, Proceedings of the 21$^{st}$ VLDB Conference, Zurich, Switzerland 1995, p. 1–12.

*Parallel Algorithms for High–dimensional Proximity Joins* by John C. Shafer and Rakesh Agrawal, Processing of the 23r$^d$ VLDB Conference, Athens, Greece 1997, pp. 176–185.

BIRCH: *An Efficient Data Clustering Method for Very Large Databases* by T. Zhang, R. Ramakrishnan and M. Livny of University of Wisconsin Computer Sciences Dept, pp. 103–114, 1996.

*Large–Scale Parallel Data Clustering* by Dan Judd, Philip K. McKinley and Anil K. Jain, 1996 International Conference on Pattern Recognition, Vienna, Austria, Aug. 1996, pp. 1–7.

*Primary Examiner*—Jean R. Homere
*Attorney, Agent, or Firm*—Flehr Hohbach Test Albritton & Herbert LLP

[57] ABSTRACT

The present invention is directed to an improved data clustering method and apparatus for use in data mining operations. The present invention determines the pattern vectors of a k-d tree structure which are closest to a given prototype cluster by pruning prototypes through geometrical constraints, before a k-means process is applied to the prototypes. For each sub-branch in the k-d tree, a candidate set of prototypes is formed from the parent of a child node. The minimum and maximum distances from any point in the child node to any prototype in the candidate set is determined. The smallest of the maximum distances found is compared to the minimum distances of each prototype in the candidate set. Those prototypes with a minimum distance greater than the smallest of the maximum distances are pruned or eliminated. Pruning the number of remote prototypes reduces the number of distance calculations for the k-means process, significantly reducing the overall computation time.

7 Claims, 5 Drawing Sheets

METHOD AND APPARATUS FOR REDUCING THE COMPUTATIONAL REQUIREMENTS OF K-MEANS DATA CLUSTERING

FIELD OF THE INVENTION

The present invention relates generally to a method and apparatus for analyzing database records to uncover relationships between various items contained within the records, and in particular to a method and apparatus for reducing the computational requirements when performing k-means clustering of similar objects into groups.

BACKGROUND OF THE INVENTION

In recent years, the progress of information automation has increased the computer databases of modem businesses to the point where a blizzard of numbers, facts and statistics are collected and stored, but less information of any significance is extracted from the massive amounts of data. The problem is that conventional computer databases are powerful in the manner in which they house data, but unimaginative in the manner of searching through the data to extract useful information. Simply stated, the use of computers in business and scientific applications has generated data at a rate that has far outstripped the ability to process and analyze it effectively.

To address this problem, a practice known as data "mining" is being developed to identify and extract important information through patterns or relationships contained in available databases. Humans naturally and quickly "mine" important concepts when interpreting data. A person can scan a magazine's table of contents and easily select the articles related to the subject of interest. A person's ability to extract and identify relationships goes beyond the simple recognizing and naming of objects, it includes the ability to make judgments based on overall context or subtle correlations among diverse elements of the available data. Computers on the other hand, cannot efficiently and accurately undertake the intuitive and judgmental interpretation of data. Computers can, however, undertake the quantitative aspects of data mining because they can quickly and accurately perform certain tasks that demand too much time or concentration from humans. Computers, using data mining programs and techniques are ideally suited to the time-consuming and tedious task of breaking down vast amounts of data to expose categories and relationships within the data. These relationships can then be intuitively analyzed by human experts.

Data mining techniques are being used to sift through immense collections of data such as marketing, customer sales, production, financial and experimental data, to "see" meaningful patterns or groupings and identify what is worth noting and what is not. For example, the use of bar-code scanners at supermarket checkouts typically results in millions of electronic records which, when mined, can show purchasing relationships among the various items shoppers buy. Analysis of large amounts of supermarket basket data (the items purchased by an individual shopper) can show how often groups of items are purchased together, such as, for example, fruit juice, children's cereals and cookies. The results can be useful for decisions concerning inventory levels, product promotions, pricing, store layout or other factors which might be adjusted to changing business conditions. Similarly, credit card companies, telephone companies and insurers can mine their enormous collections of data for subtle patterns within thousands of customer transactions to identify risky customers or even fraudulent transactions as they are occurring. Data mining can also be used to analyze the voluminous number of alarms that occur in telecommunications and networking alarm data.

The size of the data set is essential in data mining: the larger the database, the more reliable the relationships which are uncovered. Large databases, unfortunately, have more records to sift through and require more time to pass through the records to uncover any groupings or pattern regularities. The number of items for which the relationships are sought is also important to the efficiency of data mining operations: the larger the number of items, the more time to pass through the records that are required to extract reliable information.

A fundamental problem encountered in extracting useful information from large data sets is the need to detect natural groupings that can be targeted for further study. This problem is frequently encountered when data mining is applied to image processing or pattern recognition. For example, pattern recognition in the social sciences, such as classifying people with regard to their behavior and preferences, requires the grouping of data that may not be uniformly occupied in the dataset being analyzed. This is also true in image recognition, which attempts to group and segment pixels with similar characteristics (such as text or graphics) into distinct regions.

In data mining, the act of finding groups in data is known as clustering. Data clustering identifies within the dataset the dense spaces in a non-uniform distribution of data points. The partitioning of a given set of data objects (also referred to as "pattern vectors") is done such that objects in the same cluster share similar characteristics and objects belonging to different clusters are distinct. Because clustering results vary with the application requirements, several different approaches exist in the prior art. These can be broadly classified as follows:

Partitioning operations: These operations partition a dataset into a set of k clusters, where k is an input parameter for the operation. Each cluster is represented either by the gravity center of the cluster (know as a k-means method) or by one of the objects of the cluster located near its center (know as a k-medoid method). The k representatives are iteratively modified to minimize a given objective function. At each iteration, the cluster assignment of the remaining points are changed to the closest representative.

Density-based operations: These operations use information about the proximity of points for performing the clustering. The formulations are based on the assumption that all objects which are spatially proximate belong to the same cluster. This definition is typically extended for transitivity (i.e., if A is proximate to B and B is proximate to C then A and C are also proximate).

Hierarchical operations: These operations create a hierarchical decomposition of the entire data set. This is typically represented by a tree. The tree can be built bottom-up (agglomerative approach) by combining a set of patterns into larger sets, or top-down (division approach) by iteratively decomposing a set of patterns into smaller subsets.

Clustering operations are compared based on the quality of the clustering achieved and the time requirements for the computation. Depending on the application requirements, one or more of the above features of the clustering operation may be relevant.

The k-means method has been shown to be effective in producing good clustering results for many practical applications. However, a direct implementation of the k-means method requires computational time proportional to the product of number of objects and the number of clusters per iteration. For large databases, the repetitive iterations needed to yield good clustering results can be time consuming and computationally intensive.

What is needed, then, is an improved method and apparatus for implementing k-means data clustering, which produces the same or comparable (due to the round-off errors) clustering results to the k-means data clustering method as is currently practiced, while reducing the computational requirements.

Accordingly, it is an object of the present invention to provide a data mining method and apparatus for initially organizing the data objects so that all of the objects which are actually closest to a preselected sample cluster are identified quicker and more efficiently.

It is another object of the present invention to provide a data mining method and apparatus which reduces the number of distance calculations and overall time of computation without affecting the overall accuracy of performing k-means data clustering over a given dataset, as compared with the prior art methods.

It is still another object of the present invention to accomplish the above-stated objects by utilizing a data mining method and apparatus which is simple in design and use, and efficient to perform with regard to data clustering computations.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

A method and apparatus are disclosed for determining the pattern vectors of a k-d tree structure which are closest to a given prototype cluster by pruning prototypes through geometrical constraints, before a k-means process is applied to the prototypes. For each sub-branch in the k-d tree, a candidate set of prototypes is formed from the parent of a child node. The minimum and maximum distances from any point in the child node to any prototype in the candidate set is determined. The smallest of the maximum distances found is compared to the minimum distances of each prototype in the candidate set. Those prototypes with a minimum distance greater than the smallest of the maximum distances are pruned or eliminated. Pruning the number of remote prototypes reduces the number of distance calculations for the k-means process, significantly reducing the overall computation time.

DETAILED DESCRIPTION OF THE PREFERRED EMBODIMENTS OF THE INVENTION

The present invention contemplates a data mining method and apparatus for analyzing database records to uncover relationships between various items contained within the records, and in particular to a method and apparatus for reducing the computational requirements when performing k-means clustering of similar objects into groups.

Figure 1:
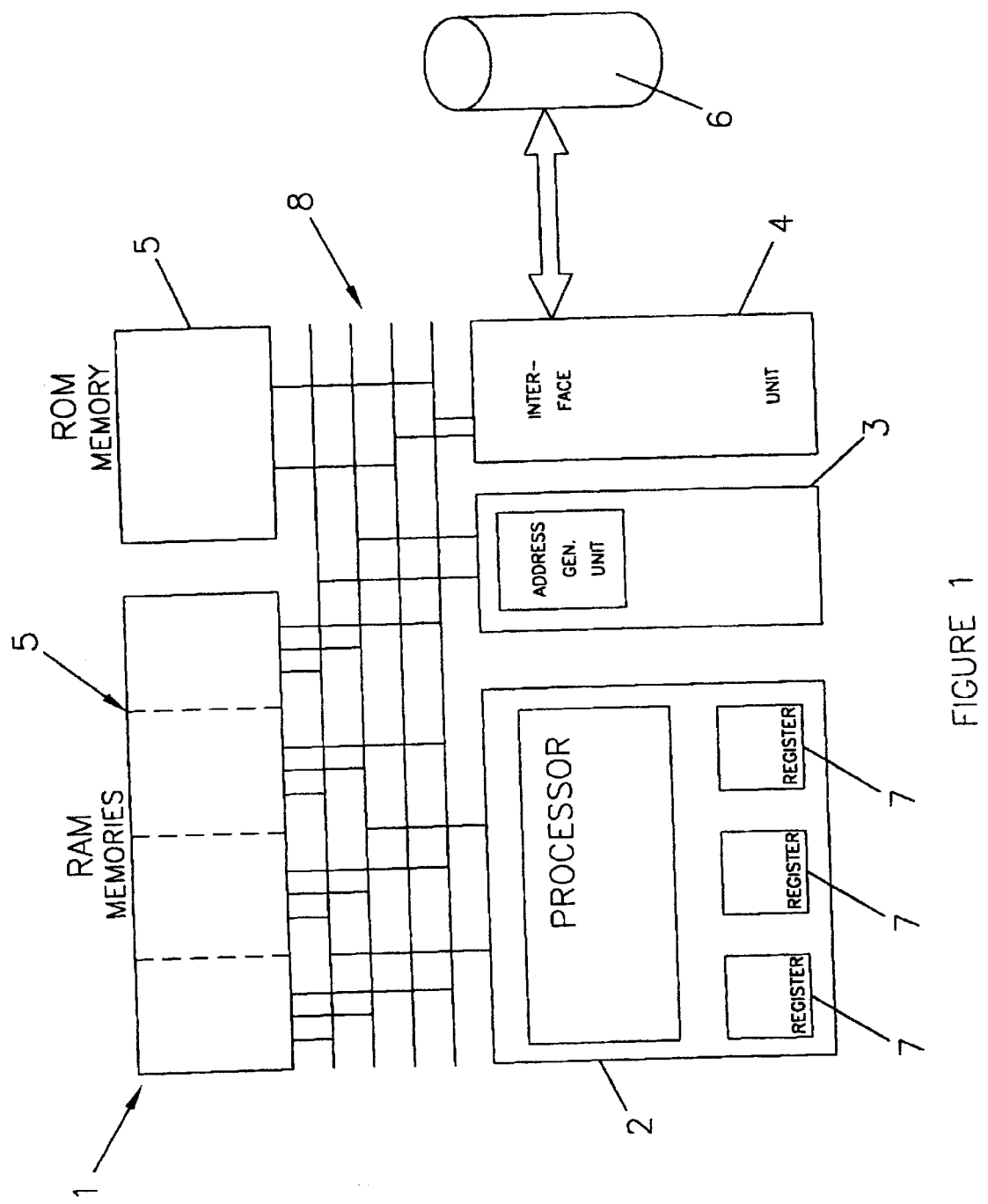
FIG. 1 is a block form diagram of an implementation of the data clustering system of the present invention on a general purpose computer.

Referring now to the drawings, in which like numerals refer to like components or steps, there is disclosed in FIG. 1 broad aspects of the apparatus of a preferred embodiment of the present invention. FIG. 1 discloses a general arrangement of a data clustering system.

In a preferred embodiment of the present invention, the data clustering system 1 works in conjunction with a general purpose computer or similar processor based electronic device for processing large buffers of data by quickly executing repetitive operations. However, it should be understood that the references to specific components typically found in general purpose computers, related to but not forming part of the invention, are provided for illustrative purposes only. References to such computer components are provided for ease in understanding how the present invention may be practiced in conjunction with known types of data processing applications. Moreover, the various components of the data clustering system 1 contemplated by the present invention may be implemented by direct electrical connection through customized integrated circuits, or a combination of circuitry and programming, using any of the methods known in the industry for providing the functions described herein without departing from the teachings of the invention. Those skilled in the art will appreciate that from the disclosure of the invention provided herein, commercial semiconductor integrated circuit technology would suggest numerous alternatives for actual implementation of the functions of the data clustering system 1 that would still be within the scope of the present invention.

According to one embodiment of the present invention, the data clustering system 1 contains, in pertinent part, a processor unit 2 (preferably a microprocessor), an address generation unit 3, and an interface unit 4. The data clustering system 1 also contains data storage memory arrays 5 which may be composed of read only memory (ROM) and random access memory (RAM) storage locations, and preferably a combination of both. The processor 2, address generation unit 3, interface unit 4 and the memory arrays 5 are all interconnected via a suitable communication bus 8 as is practiced in the industry. The memory arrays 5 have address inputs and data inputs and outputs for storing and retrieving data from different storage locations within the arrays 5. The address generation unit 3 has address outputs coupled to the address inputs of the memory array 5 and to address inputs of the interface unit 4. The interface unit 4 also has address outputs connected to address inputs of external mass storage units 6.

The processor 2 provides decision making and control operations, and further includes a plurality of registers 7, composed of both general purpose storage registers and specific purpose registers such as accumulators, counters and pointers. As practiced in the industry, the processor 2 communicates through the interface unit 4 to external mass storage units 6 such as disk drive units. Similar to the memory 5, the disk drive units 6 include data inputs, data outputs, and address inputs so that data can be read from or written to the disk drives 6. It is anticipated that the database will be maintained on the disk drives 6, with portions of the database being copied into the memory arrays 5 so that the processor 2 can manipulate the data. In a preferred embodiment of the present invention, the clock speed of the processor 2 is 66 MHz and the RAM portion of the memory array 5 is 128 MByte.

In general, the aim of the present invention is to have the processor 2 of the data clustering system 1 partition a dataset of n objects or pattern vectors having p attributes or measurements into k clusters. That is, the data processing system 1 will perform recursive iterations over the data set to classify the data into k groups such that each group contains at least one pattern vector, with every pattern vector belonging to one cluster. In the present invention, the processor 2 strives to group the data into clusters for which certain characteristics or graphics look best, or to retain the clustering that appears to give rise to the most meaningful interpretation. Here, the more related or close the pattern vectors are, the smaller the "distance" d between the pattern vectors. Conversely, the more dissimilar the characteristics between the pattern vectors, the greater the value of d. Thus, pattern vectors of the same cluster will, in most cases, have a smaller measurement for d than pattern vectors in two distinct clusters.

As practiced in the industry, the processor 2 performs clustering so as to minimize the average dissimilarity (average distance) of a pattern vector to all other pattern vectors of the same cluster. In the present invention, k-means clustering is practiced, in which pattern vectors i are defined by measurement values and the cluster is characterized by its centroid. $C^j_{LS}$ is defined as the linear sum of the pattern vectors in the $j^{th}$ cluster Cj. The centroid is defined as the linear sum $C^j_{LS}$ divided by the number of pattern vectors in the cluster.

Figure 2:
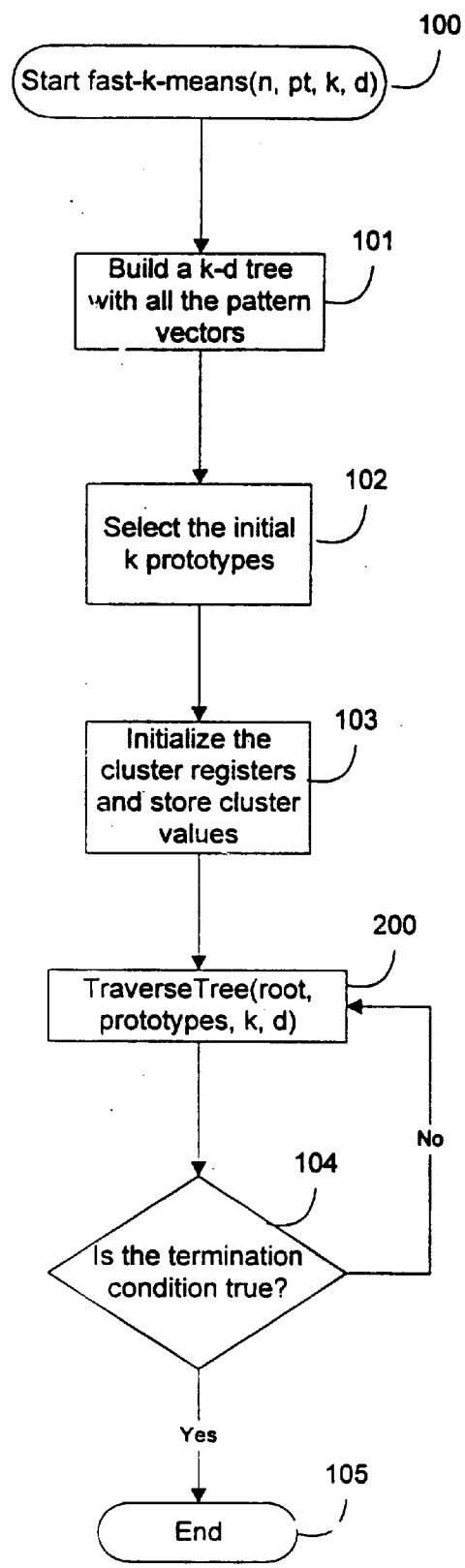
FIG. 2 is a flowchart illustrating the overall operation of the data clustering system according to one embodiment of the present invention.

Referring now to FIG. 2, the operation of one embodiment of the present invention will now be described. In step 100, the processor 2 begins the preparation for performing a k-means clustering operation, including resetting memory arrays 5 and registers 7.

Figure 3:
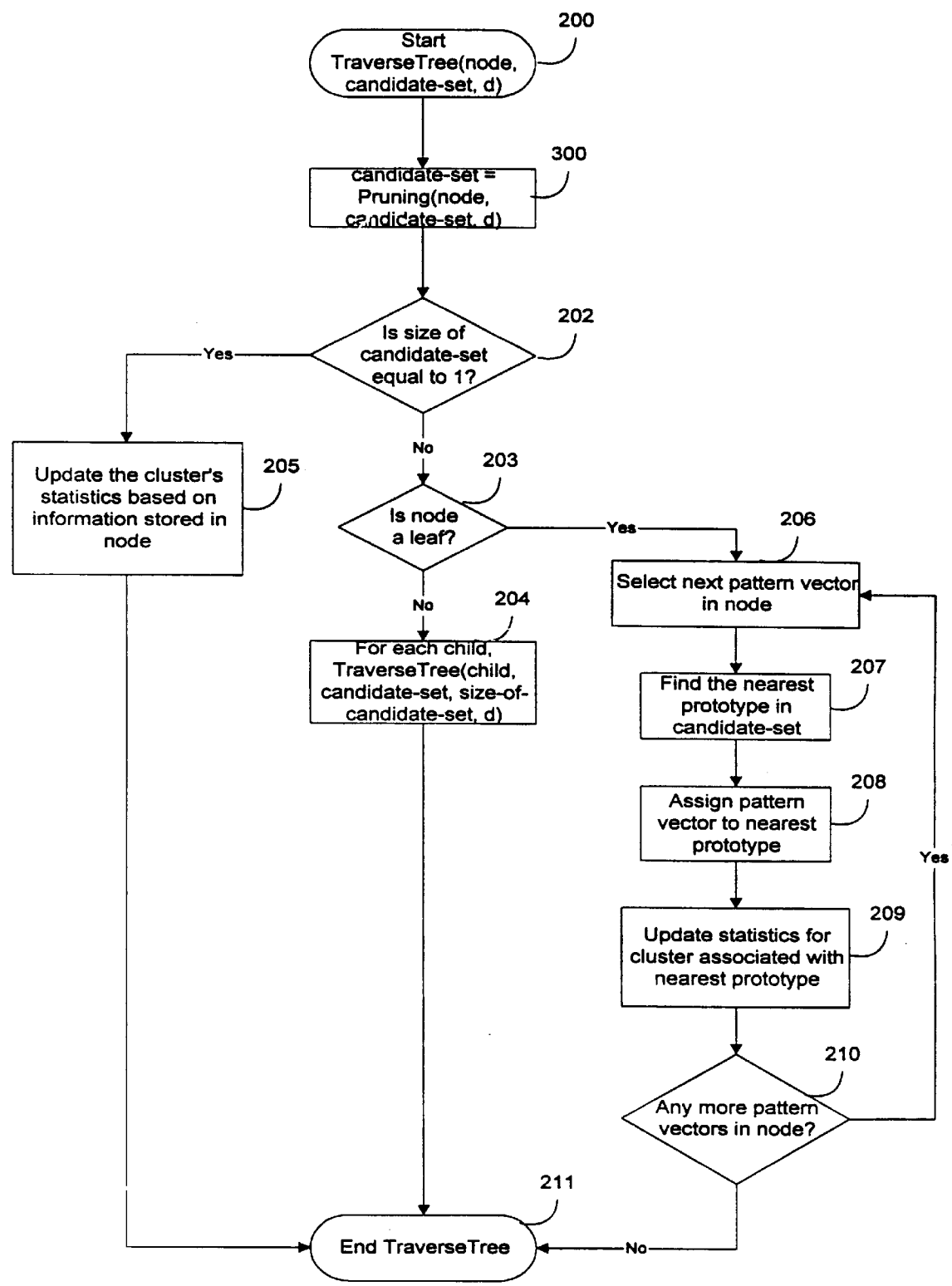
FIG. 3 is a flowchart illustrating a traverse tree operation of the data clustering system according to one embodiment of the present invention.

In step 101, a k-d tree, as known to those in the industry, is constructed to organize the pattern vectors (represented as "pt" in FIGS. 2–4) of dimensions d into k non-empty subsets. These values are stored in the RAM of memory arrays 5. In the present invention, the k-d tree is built by splitting the dimension with the longest length across all nodes at the same level of the tree, and by using a control splitting point to divide the splitting dimensions into two equal parts (as measured by width). As a result, the root node will be singular, while the next level below the root node will contain two nodes. These two nodes will be divided at the next level into a total of four nodes, and so on.

It should be understood that although these approaches are used in the preferred embodiment for performance based reasons, the present invention is not so limited. For example, a common dimension across all nodes at the same level of the tree could be chosen instead of the longest length splitting dimension. Similarly, a median splitting point, which requires the additional calculation of the median, could be used instead of the preferred central splitting approach without departing from the scope of the present invention.

In the present invention, the depth of the k-d tree is referred to as D. The root node of the k-d tree represents all of the pattern vectors, while the children nodes of the root represent subsets of the pattern vectors completely contained in subspaces. The nodes may be graphically represented as "boxes." As can be understood, the box that represents the root node will be the largest, while the nodes at the lower level will be represented by smaller boxes.

After this initial partitioning of the pattern vectors in the k-d tree formation, a number of points in multidimensional space are randomly generated or derived from the data set by processor 2 (step 102). These points are called prototypes and are used as seeds for generating clusters. These prototypes are associated with the k-d tree as a whole. In future iterations of the method disclosed in the present invention, the prototypes are redefined to be the centroids of clusters that are iteratively refined by the method. These initial prototypes are stored in memory arrays 5, and depending on the size of the dataset, in external mass storage units 6 via interface unit 4. For each prototype, the processor 2 computes data regarding the number of pattern vectors m, the linear sum of the pattern vectors, ("LS", calculated as $\Sigma^m_{i=j}P_i$), and the square sum of the pattern vectors ("SS", calculated as $\Sigma^m_{i=i}P_i^2$). These values are calculated for the entire dataset, with the corresponding computed values stored in registers 7 after the registers have been reset and initialized (step 103).

Next, a number of interations are performed over the k-d tree, referred to herein as a "traverse tree" operation (Step 200). The traverse tree operation is disclosed in more detail in FIG. 2. Turning now to FIG. 2, for each iteration of a preferred embodiment of the present invention, the k-d tree is traversed using a depth first strategy. Starting at the root node, a pruning operation is advantageously applied for each sub-branch of nodes of the tree, with the prototypes in the sub-branch being formed into "candidate sets" for the purpose of evaluation (Step 300).

Figure 4:
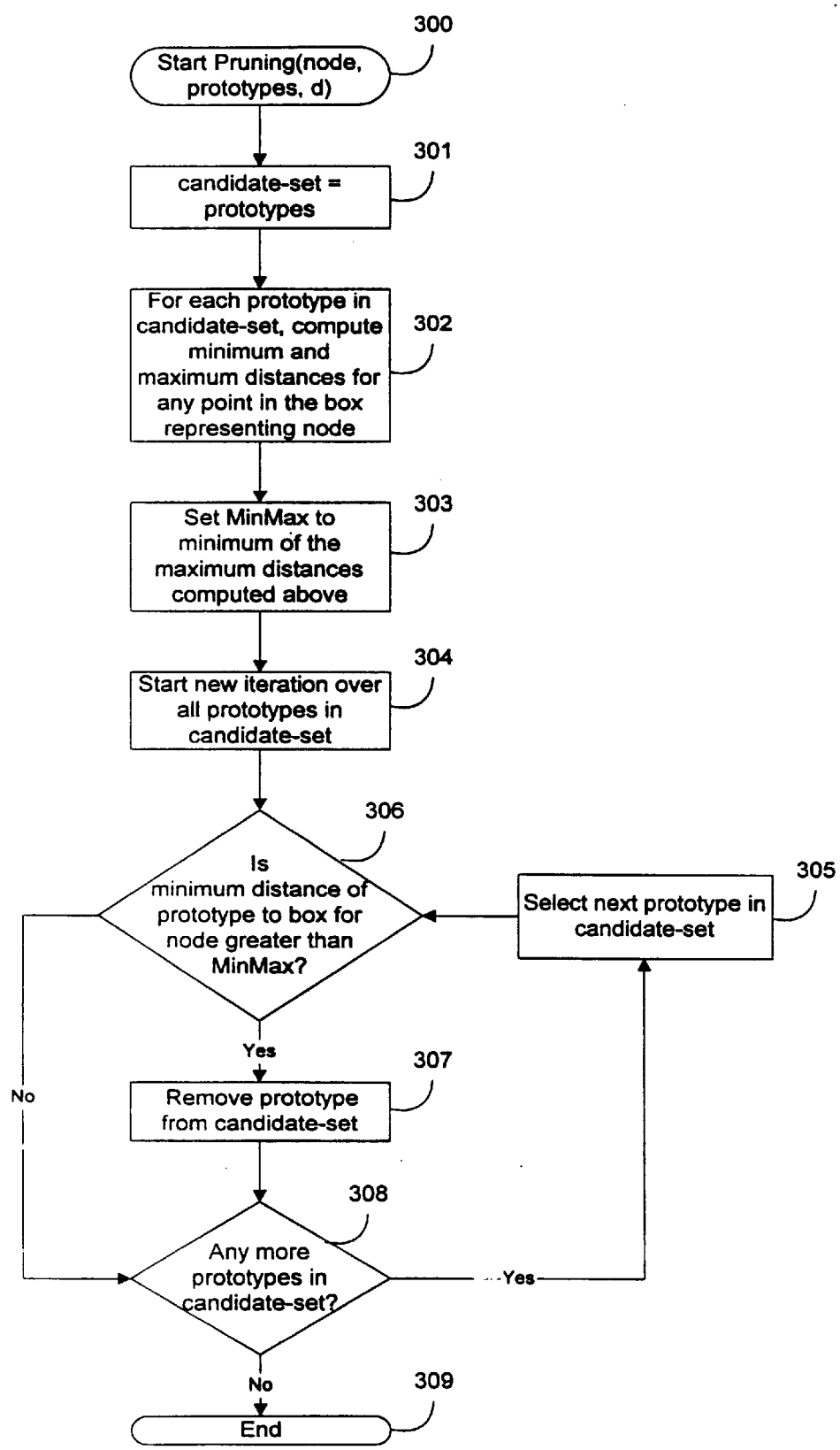
FIG. 4 is a flowchart illustrating a pruning operation of the data clustering system according to one embodiment of the present invention.

Referring to FIG. 4 for a detailed description of the pruning operation, in step 301, the candidate set of prototypes is compiled for the portion of the subtree that the operation will first branch down. The candidate set in each case consists of the prototypes found in the first node of the branch of the tree that the process encounters (referred to as the "parent" node). Based on data generated with regard to the prototypes found in the branch node in the level below the parent node (referred to as the "child" node), certain prototypes in the candidate set can be efficiently eliminated through the pruning process of the present invention to form a smaller candidate set in the child node.

Figure 5:
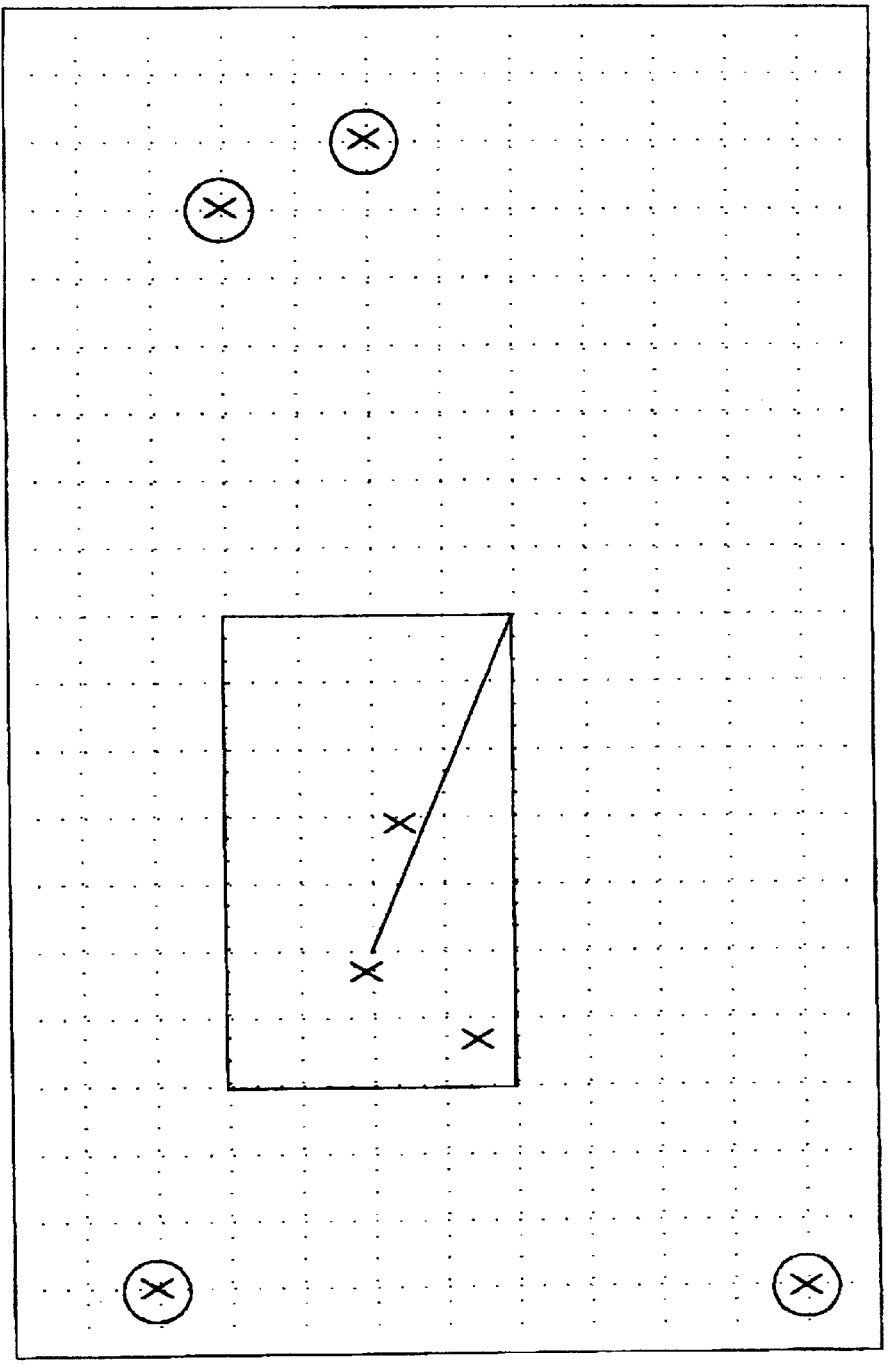
FIG. 5 is a graphical representation of the pruning method and apparatus as applied to a child node according to one embodiment of the present invention.

For the first candidate set of prototypes, beginning with the root node, the processor 2 computes the minimum and maximum distances from each prototype to any point in the subspace representing the child node (step 302). The subspace of a node, as mentioned earlier, is represented as a box. Reference to FIG. 5, in combination with FIG. 4, will be helpful at this point. FIG. 5 is a graphical representation of the dataset in which X represents different prototypes of the candidate set, the inner box is a child node of the parent node (outer box), and d is the distance from a prototype to one corner of the box. It can easily be understood from FIG. 5 that the maximum distances from a prototype X to the box will be to one of the corners of the box.

This distance is computed in a preferred embodiment of the present invention as follows:

The designation furthest$_i$ is used to represent the corner of the node from prototype i (p$_i$). The coordinates of furthest$_i$ (furthest$_{i1}$, furthest$_{i2}$, ... furthest$_{id}$) are computed as follows:

$$furthest_{ij} = \begin{cases} B_j^l : |B_j^l - p_{ij}| > |B_j^u - p_{ij}| \\ B_j^u : \text{Otherwise} \end{cases}$$

where B$^l_j$ and B$^u_j$ are the lower and upper coordinates of the box along dimension j.

The distance between furthest$_i$ and p$_i$ is computed as follows:

$$distance = \sqrt{\sum_{j=1}^{d} (p_{ij} - furthest_{ij})^2}$$

Similarly, nearest$_i$ represents the shortest distance of any point in a box to a prototype p$_i$. In an embodiment of the present invention, the coordinates of nearest$_i$ (nearest$_{i1}$, nearest$_{i2}$, ..., nearest$_{id}$) are computed as follows:

$$nearest_{ij} = \begin{cases} p_{ij} : p_{ij} \in [B_j^l, B_j^u] \\ B_j^l : p_{ij} < B_j^l \\ B_j^u : p_{ij} > B_j^u \end{cases}$$

Advantageously, the coordinates of the box of the child node is exactly the same as its parent except for one dimension q which has been used for splitting at the parent node. This information is exploited in one embodiment of the present invention to reduce computation time. The present invention uses the maximum and minimum distances of the prototype to the parent node; max$_{parent}$ and min$_{parent}$ to refer to these distances. The maximum square distance of prototype p$_i$ with its parent is computed as:

$$max^2_{parent} = \sum_{j=1}^{d} (p_{ij} - furthest_{ij})^2$$

The distance to the child node is computed as:

$$max^2_{child} = (\max|p_{iq} - b_q^l|, |p_{iq} - b_q^u|)^2 + \sum_{j=1 \text{ and } j \neq q}^{d} (p_{ij} - furthest_{ij})^2$$

where q are the dimension used for splitting at the parent node and b$^l_q$ and b$^u_q$ are the lower and upper coordinates of the child box along dimension q. This is used to express the maximum square distance for the child node in terms of its parent as follows:

max$^2_{child}$=max$^2_{parent}$−max(|P$_{iq}$−B$^l_q$|,|P$_{iq}$−B$^u_q$|)$^2$+(max(|P$_{iq}$−b$^l_q$|,|P$_{iq}$−b$^u_q$|))$^2$ The value of min$_{child}$ is similarly obtained:

min$^2_{child}$=min$^2_{parent}$−(|P$_{iq}$−nearest.parent$_{iq}$|)$^2$+(|P$_{iq}$−nearest.child$_{iq}$|)$^2$ where $$nearest.parent_{iq} = \begin{cases} p_{iq} : p_{iq} \in [B_q^l, B_q^u] \\ B_q^l : p_{iq} < B_q^l \\ B_q^u : p_{iq} > B_q^u \end{cases}$$

and $$nearest.child_{iq} = \begin{cases} p_{iq} : p_{iq} \in [b_q^l, b_q^u] \\ b_q^l : p_{iq} < b_q^l \\ b_q^u : p_{iq} > b_q^u \end{cases}$$

For each candidate prototype then, the minimum and maximum distances are computed from any point (pattern vector) in the box to that candidate prototype. Of the maximum distances found, the smallest one is identified as "MinMax" and stored in a register 7 (step 303). It should be noted that although use of a register 7 is preferred in the present embodiment for efficiency purposes, the present invention is not so limited in that a designated address in memory array 5, a designated area of external storage 6, or the like, may be used for this function without departing from the scope of the invention.

All prototypes are potential candidates at the root node. However, for children of the root node, the present invention advantageously prunes away some of the prototypes found in the candidate set of the parent node by using the MinMax value in combination with the distance calculations calculated in the previous step 302. In step 304, the prototype of a child node is selected, and the distance calculations performed by processor 2 are compared to the stored MinMax value. If the minimum distance of this prototype to the box representing the node is greater than the value for MinMax, the prototype is eliminated from the prototypes in the candidate set that will be associated with the child node (step 305).

This approach is applied iteratively until all prototypes in the candidate set have been compared to MinMax (steps 305–308). When the process reaches step 309, the pruning operation is completed for that particular sub-branch, and the traverse tree operation (step 200, FIG. 3) resumes for the next sub-branch.

The foregoing pruning operation may be understood by its application in the following example:

If a national service company wanted to determine where to place service centers in the U.S. so that its customers (objects) would have to travel the minimum distance to such centers, a division of the geographic area of the U.S. might yield the 48 state boundary lines. The geographic area of each state would be equivalent to the nodes of the k-d tree. The location of randomly chosen service centers (equivalent to centroids), for example, could be the city centers of Los Angeles, San Francisco, Las Vegas and New York (a candidate set of prototypes). The distance from the locations of each of the residents (objects) in California (node) to Los Angeles, San Francisco, Las Vegas and New York (prototypes of the candidate set) would then be calculated, with minimum and maximum distances computed. The minimum value of the maximum distances found would then be identified. A centroid in New York would have a minimum distance to a resident in California that would be greater than the smallest of any of the maximum values (MinMax) for distances calculated for any resident in California to Los Angeles, San Francisco or Las Vegas. Therefore, the centroid at New York would be pruned from further consideration. On the other hand, a centroid located at, for example, Las Vegas would not have a minimum distance for any resident in the box of California that is larger than the smallest of the distances to Los Angeles or San Francisco. Therefore, a service center at Las Vegas would not be pruned.

Returning now to FIG. 3, after the pruning iterations are completed in Step 300, the process moves to Step 202. In this step, the processor 2 checks if the number of prototypes remaining in a candidate set, after the pruning operation in Step 300, is equal to one. If only one prototype in the candidate set remains, the statistics (m, LS, SS) of the cluster associated with the prototype are updated for all pattern vectors in that node (step 205). At this point, all pattern vectors in the pruned subspace have the one prototype of the candidate set as their closest prototype. Traversal below this internal node is not pursued since the pattern vectors can only be assigned to the one prototype.

The pruning process of the present invention is repeated on every sub-branch until either one prototype remains in the candidate set or a node with no child nodes below it (referred to as "leaf" node) is reached. Through the pruning process, a significant number of prototypes can be eliminated before a direct k-means operation is performed to determine the final clustering.

When the pruning process does not result in a candidate set containing only one prototype, the processor 2 checks the node for its status as a branch node or a leaf node (Step 203). For each branch node, the process returns to the traverse tree process at Step 200 for another iteration of the child nodes in the sub-branch (Step 204). The process repeats down every branch of the k-d tree, as described above. At this point, unless a leaf node containing more than one prototype is involved, the pruning has been completed, and the traverse tree process itself can be terminated (Step 211).

When the traverse tree process reaches a leaf node containing more than one prototype in the candidate set (Step 203), the process employs a k-means operation as practiced by those skilled in the art to partition the pattern vectors among the remaining prototypes. Each of the pattern vectors are subjected to distance calculations to find the nearest prototype (Steps 206–207). Each of these pattern vectors is assigned to its nearest prototype (Step 208). Every time a new pattern vector is assigned to a prototype, the statistics associated with the cluster being formulated need updating. The new centroid is computed, along with the m, LS and SS statistics (Step 209). These centroids may be used for a next set of prototypes in subsequent iterations of the process, dynamically tuning the clustering results. The process repeats Steps 206 through 209 for each pattern vector until they are all assigned to prototypes (Step 210).

Returning to FIG. 2, the k-d tree has now been pruned of certain prototypes, and all pattern vectors have been assigned to a prototype through the traverse tree process (Step 200). However, before the process is completed, that is, before the prototypes are determined as the final clusters, the prototypes are evaluated against preselected threshold values to determine if certain termination conditions are met. These termination conditions are set by the user, and in one preferred embodiment of the present invention, are determined by a distance-error function E for clustering quality, such as:

$$E = \sum_{j=1}^{k} \sum_{r \in c_j} |r - w_j|^2$$

where $w_j$ is the centroid of cluster $c_j$.

For high quality clustering, choosing k clusters when k is close in value to the number of pattern vectors n would yield a low error value since nearly each pattern vector would have its own cluster. This extreme choice of clustering naturally defeats the purpose of clustering, but yields high quality clusters. On the other side of the scale, having a low number of clusters (for example, k=2) would likely yield low quality, high error value clusters. Until the user determined quality of the clustering is achieved (i.e., the termination condition is met), the new centroids calculated in Step 209 (see FIG. 3) are used for the next set of prototypes in the traverse tree process iterations (Step 200). When error values fall below preset thresholds, (i.e., when no further improvements are made in a given pass of the traverse tree process (Step 200)), the termination conditions will be met and the process of data clustering halts.

The key to reducing computation time in k-means clustering is to minimize the number of distance calculations. The present invention eliminates a significant amount of distance calculations by, in sum, (i) finding the minimum and maximum distances from the centroid of each prototype in a candidate set to any point in the subspace, (ii) identifying the minimum of the maximum distances (MinMax) previously calculated, and (iii) pruning or eliminating all prototypes in the candidate set with a minimum distance greater than MinMax. Moreover, because the distance calculations are performed only with internal nodes (representing many pattern vectors) and not the pattern vectors themselves, the number of distance calculations are reduced. Experimented results performed by the inventors have found that the present invention can improve the prior art k-means process by two orders of magnitude in the total number of distance calculations and the overall time of computation.

Although the present invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. A method for reducing the computation time in k-means data clustering operations over a data set containing a plurality of points by minimizing the number of distance calculations between said points for fast mining of database records to uncover relationships therebetween, wherein said method comprises:

generating a k-d tree structure of subspaces, wherein each subspace includes a plurality of said points;

generating a plurality of prototypes, wherein each of said prototypes has a centroid and is representative of a plurality of points, said prototypes being the seeds for generating clusters of said points;

generating a candidate set having a plurality of said prototypes;

computing the minimum and maximum distances from the centroid of each of said prototypes in said candidate set to any point in said subspace;

identifying the minimum of the maximum distances from the centroid of each of said prototypes in said candidate set to any point in said subspace;

eliminating all prototypes in the candidate set with a minimum distance greater than the minimum of the maximum distances calculated from the centroid of each of said prototypes in said candidate set to any point in said subspace; and checking the remaining number of prototypes in the candidate set, and if only one prototype remains, updating data storage means with data characteristics of the prototype.

2. A method for reducing the computation time in k-means data clustering operations according to claim 1, further comprises computing a second set of subspaces using the dimensions for the first subspaces and a splitting dimension.

3. A method for reducing the computation time in k-means data clustering operations over a data set containing a plurality of points by minimizing the number of distance calculations between said points for fast mining of database records to uncover relationships therebetween, wherein said method comprises:

generating a k-d tree structure of subspaces, wherein each subspace includes a plurality of said points;

generating a plurality of prototypes, wherein each of said prototypes has a centroid and is representative of a plurality of points, said prototypes being the seeds for generating clusters of said points;

generating a candidate set having a plurality of said prototypes;

computing the minimum and maximum distances from the centroid of each of said prototypes in said candidate set to any point in said subspace;

identifying the minimum of the maximum distances from the centroid of each of said prototypes in said candidate set to any point in said subspace;

eliminating all prototypes in the candidate set with a minimum distance greater than the minimum of the maximum distances calculated from the centroid of each of said prototypes in said candidate set to any point in said subspace; and checking the remaining number of prototypes in the candidate set, and if more than one prototype remains, assigning each point in a subspace to the closest prototype in the candidate set.

4. A method for reducing the computation time in k-means data clustering operations according to claim 3, further comprises performing a k-means data clustering operation over the data set containing a plurality of points using the prototypes that are remaining.

5. A method for grouping a plurality of data points into disjoint clusters for fast mining of database records to uncover relationships therebetween, comprising:

generating a plurality of nodes, wherein each node includes a plurality of said data points:

generating a plurality of prototypes, wherein each of said prototypes is representative of a plurality of points;

generating a set having a plurality of said prototypes in said set to any point in said node;

computing the minimum and maximum distances from each of said prototypes in said set to any point in said node;

determining the minimum of the maximum distances from each of said prototypes in said set to any point in said node;

eliminating all prototypes in said set with a minimum distance greater than smallest of the maximum distances computed from each of said prototypes in said set to any point in said node; and determining the remaining number of prototypes in the candidate set, and if only one prototype remains, updating data storage means with data characteristics of the prototype.

6. A method for grouping a plurality of data points into disjoint clusters for fast mining of database records to uncover relationships therebetween, comprising generating a plurality of nodes, wherein each node includes a plurality of said data points;

generating a plurality of prototypes, wherein each of said prototypes is representative of a plurality of points;

generating a set having a plurality of said prototypes in said set to any point in said node;

computing the minimum and maximum distances from each of said prototypes in said set to any point in said node;

determining the minimum of the maximum distances from each of said prototypes in said set to any point in said node;

eliminating all prototypes in said set with a minimum distance greater than smallest of the maximum distances computed from each of said prototypes in said set to any point in said node; and determining the remaining number of prototypes in said set, and if more than one prototype remains, assigning each point in a node to the closest prototype in said set.

7. A method for grouping a plurality of data points into disjoint clusters according to claim 6, further comprises performing a k-means data clustering operation over the data set containing a plurality of points using the prototypes that are remaining.

* * * * *